US011886700B1

(12) United States Patent
Lee et al.

(10) Patent No.: US 11,886,700 B1
(45) Date of Patent: Jan. 30, 2024

(54) SYSTEM AND METHOD FOR MAGNETIC SENSING MULTICONFIGURATION DATA PROCESSING SYSTEMS

(71) Applicant: Dell Products L.P., Round Rock, TX (US)

(72) Inventors: Hsu-Feng Lee, Taipei (TW); Chiu-Jung Tzen, Zhubei (TW); Brandon Joel Brocklesby, Pflugerville, TX (US); Michiel Sebastiaan Emanuel Petrus Knoppert, Amsterdam (NL); Loo Shing Tan, Singapore (SG); Gerald Rene Pelissier, Mendham, NJ (US); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/181,125

(22) Filed: Mar. 9, 2023

(51) Int. Cl.
*G06F 3/04886* (2022.01)
*G06F 3/046* (2006.01)
*G06F 3/044* (2006.01)
*G06F 3/043* (2006.01)
*G06F 3/045* (2006.01)

(52) U.S. Cl.
CPC .......... *G06F 3/04886* (2013.01); *G06F 3/046* (2013.01); *G06F 3/043* (2013.01); *G06F 3/044* (2013.01); *G06F 3/045* (2013.01); *G06F 2203/04108* (2013.01)

(58) Field of Classification Search
CPC ....... G06F 1/1601; G06F 1/1613–1622; G06F 1/1643; G06F 1/1662; G06F 1/1675–1681; G06F 3/017; G06F 3/033; G06F 3/0346–0354; G06F 3/03545; G06F 3/038; G06F 3/041–0412; G06F 3/0416–04162; G06F 3/043; G06F 3/044; G06F 3/045; G06F 3/046; G06F 3/0488–04886; G06F 2203/04108; G06F 2203/04114
See application file for complete search history.

(56) References Cited

U.S. PATENT DOCUMENTS

| 8,368,649 | B2 | 2/2013 | Hall | |
| 8,654,095 | B1 * | 2/2014 | Cho | G06F 1/1652 345/173 |
| 9,323,356 | B2 | 4/2016 | Kuo | |
| 10,719,145 | B1 * | 7/2020 | Files | G06F 1/169 |
| 11,809,646 | B1 | 11/2023 | Knoppert et al. | |
| 2005/0083316 | A1 * | 4/2005 | Brian | G06F 3/0346 345/179 |
| 2006/0205368 | A1 * | 9/2006 | Bustamante | H01Q 1/2266 455/272 |

(Continued)

*Primary Examiner* — Keith L Crawley
(74) *Attorney, Agent, or Firm* — Womble Bond Dickinson (US) LLP

(57) ABSTRACT

Methods and systems for providing computer implemented services using user input are disclosed. To obtain the user input, a human interface device may be used. Interpretation of actuation of the human interface device may be based on a location of the human interface device relative to a sensing system when the actuation is performed. Sensing elements integrated into the sensing system may be used to obtain user input from the human interface device at the location, the user input then being interpreted based on the location to provide the computer implemented services.

20 Claims, 10 Drawing Sheets

(56) References Cited

U.S. PATENT DOCUMENTS

| | | | |
|---|---|---|---|
| 2010/0053085 A1 | 3/2010 | Hall | |
| 2013/0314338 A1* | 11/2013 | Nam | G06F 3/041 |
| | | | 345/173 |
| 2014/0267150 A1 | 9/2014 | Masashi | |
| 2015/0277598 A1* | 10/2015 | Aurongzeb | G06F 1/1677 |
| | | | 345/157 |
| 2016/0299606 A1* | 10/2016 | Go | G06F 3/04883 |
| 2016/0313819 A1 | 10/2016 | Ancona et al. | |
| 2019/0113966 A1 | 4/2019 | Connellan et al. | |
| 2019/0187856 A1 | 6/2019 | Bruwer et al. | |
| 2019/0339776 A1* | 11/2019 | Rosenberg | G06F 3/0416 |
| 2020/0004346 A1 | 1/2020 | Vlasov et al. | |
| 2020/0371625 A1* | 11/2020 | Katsurahira | G06F 3/03545 |

\* cited by examiner

SYSTEM AND METHOD FOR MAGNETIC SENSING MULTICONFIGURATION DATA PROCESSING SYSTEMS

FIELD

Embodiments disclosed herein relate generally to user input in computing systems. More particularly, embodiments disclosed herein relate to systems and methods to obtain user input in configurable computing systems.

BACKGROUND

Computing devices may provide computer implemented services. The computer implemented services may be used by users of the computing devices and/or devices operably connected to the computing devices. The computer implemented services may be performed using input from users. For example, users of computing devices may provide input as part of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
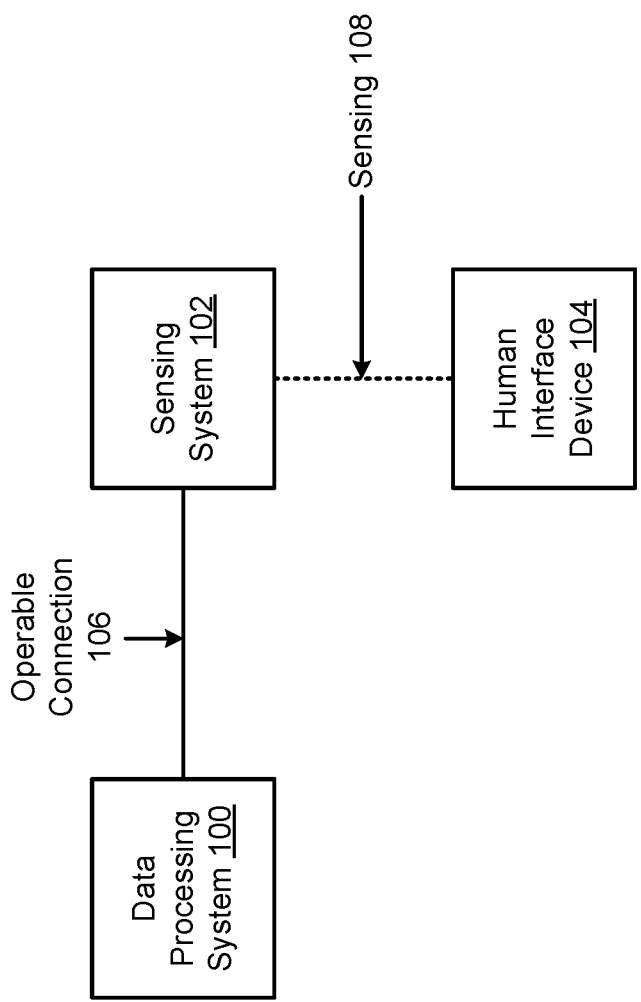
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, user input may be obtained.

To obtain the user input, a human interface device may be used. The human interface device may be actuated by a user, and the actuations may be translated into magnetic fields detectable by a sensing system.

The sensing system may sense the magnetic fields and obtain information reflecting changes in the position and/or orientation of a magnet of the human interface device that generates the magnetic fields. Thus, information reflecting actuations of the human interface device by the user may be encoded in the magnetic fields and may be sensed.

The obtained information may then be used to identify, for example, user input provided by the user. For example, the information regarding changes in the position and/or orientation of the magnet may be translated into user input. The user input may then be used to drive computer implemented services.

For example, the user input may be provided by the user to activate certain functionalities, change functionalities, terminate functionalities, and/or invoke desired activities by a data processing system.

To encode information regarding different types of actuations of human interface devices, the sensing system may include sensing elements integrated with a data processing system, the data processing system being reconfigurable, and the sensing elements being positioned at fixed locations included in the reconfigurable data processing system (DPS). Information obtained from the sensing elements may be interpreted based on a configuration of the reconfigurable DPS. By doing so, the obtained information may indicate an absolute location (relative to the fixed locations) of the human interface device and interpret one or more actuations provided therein based on the configuration.

For example, an actuation of the human interface device, while the reconfigurable DPS is configured to a first configuration, may be associated with modifying audio settings of the reconfigurable DPS. The manner in which the actuation is performed, while the reconfigurable DPS is configured to the first configuration, may be used to determine how the audio settings are modified. Additionally, the same actuation of the human interface device, while the reconfigurable DPS is configured to a second configuration, may be associated with modifying a different setting. The manner in which the actuation is performed, while the reconfigurable DPS is configured to the second configuration, may be used to determine how the different setting is modified.

Similarly, for example, the configuration of the reconfigurable DPS may be used to identify (i) portions of data regarding actuations of the human interface device to ignore when identifying user input and (ii) other portions of the data regarding the actuations of the human interface device to focus on when identifying user input. By doing so, the accuracy of user input obtained by the system may be improved by screening out lower quality measurements of the actuation of the human interface device from the interpretation process.

Resulting changes in position and/or orientation of the magnet from an actuation of the human interface device may encode sufficient information in the magnetic field emanating from the human interface device to distinguish actuations of the human interface device from repositioning of the human interface device. Additionally, the actuations and/or the repositioning may be interpreted differently depending on the configuration of the reconfigurable DPS when one of the actuations and/or repositioning is performed.

By using a magnet, the human interface device may not need to be powered, may include fewer components thereby reducing the likelihood of component failures, may be made lighter/smaller thereby reducing loads placed on user of user input devices, etc.

To sense the magnetic field, one or more sensing elements may be integrated into a reconfigurable data processing system (DPS) or other type of device. The sensing elements of the sensing system may provide information regarding actuations of human interface devices positioned near the reconfigurable DPS.

By doing so, a system in accordance with embodiments disclosed herein may have improved portability and usability when compared to other types of devices used to obtain user input that may be powered. Thus, embodiment disclosed herein may address, among others, the technical challenge of loads placed on users during acquisition of user input and mechanical or electrical failure of devices tasked with obtaining user input.

In an embodiment, a method for interpreting user input obtained using a human interface device is provided.

The method may include identifying, by a reconfigurable data processing system, a presence of the human interface device within a sensing range of a sensing system; obtaining, based on the identified presence, sensor data from a sensing system of the reconfigurable data processing system, the sensing system being adapted to track a magnetic field emanating from the human interface device; identifying a configuration of the reconfigurable data processing system when the sensor data is obtained; obtaining a type of the user input based on the sensor data and the identified configuration of the reconfigurable data processing system; identifying an operation to be performed based on the type of the user input; and performing the operation.

The reconfigurable data processing system may include a chassis; a display enclosure that houses a display; and a joint that rotatably connects the chassis to the display enclosure, and a length of the joint being aligned with a width of the chassis, and a width of the display enclosure, wherein the sensing system may include a first set of sensing arrays and a second set of the sensing arrays, the first set of the sensing arrays may include a first portion of the first set of the sensing arrays, the first portion being positioned along a front side of an interior of the chassis; a second portion of the first set of the sensing arrays, the second portion being positioned along a first lateral side of the interior of the chassis; and a third portion of the first set of the sensing arrays, the third portion being positioned along a second lateral side of the interior of the chassis, wherein the second set of the sensing arrays are positioned with the display enclosure.

The joint may be adapted to facilitate reconfiguration of an orientation of the chassis and display enclosure between at least two configurations, in a first of the at least two configurations both a keyboard of the reconfigurable data processing system and a display of the reconfigurable data processing system are presented to a user, and in a second of the at least two configurations only the display is presented to the user.

While in the first of the at least two configurations, the first set of sensing arrays and the second set of the sensing arrays may be able to sense the presence of the human interface device proximate to the display, and while in the second of the at least two configurations, the first set of sensing arrays may be unable to sense the presence of the human interface device proximate to the display and the second set of sensing arrays may be able to sense the presence of the human interface device proximate to the display.

The sensor data may include a first portion obtained from the first set of sensing arrays and a second portion obtained from the second set of sensing arrays.

Obtaining the type of the user input based on the sensor data and the identified configuration may include: in a first instance of the sensor data where the chassis and the display enclosure are in the first configuration: using the first portion and the second portion of the sensor data to obtain the type of the user input; in a second instance of the sensor data where the chassis and the display enclosure are in the second configuration: discarding the first portion of the sensor data; and using the second portion of the sensor data to obtain the type of the user input.

Using the second portion of the sensor data to obtain the type of the user input may include ingesting the second portion of the sensor data into a first pattern matching system that provides the type of the user input.

Using the first portion and the second portion of the sensor data to obtain the type of the user input may include ingesting the first portion of the sensor data and the second portion of the sensor data into a second pattern matching system that provides the type of the user input.

In an embodiment, a non-transitory media is provided that may include instructions that when executed by a processor cause the computer-implemented method to be performed.

In an embodiment, a data processing system is provided that may include the non-transitory media and a processor and may perform the computer-implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, user input may be obtained. The user input may indicate, for example, how the computer implemented services are to be provided. The user input may include any type and quantity of information.

To obtain the user input, a user may perform physical actions such as, for example, pressing buttons, moving structures, etc. These physical actions may be sensed by various devices, and the sensing may be interpreted (e.g., translated) to obtain the user input (e.g., data).

However, sensing physical actions by a user may involve use of sensors and/or devices that may consume power. The weight of the devices and forces applied by sources of the consumed power (e.g., batteries, cords to power supplies, etc.) may place a load (e.g., mechanical) on the user attempting to perform the physical actions. The mechanical load may fatigue the user, reduce the portability of the devices (e.g., mouses), and/or may be undesirable for other reasons.

Additionally, the manner in which these actuations may be interpreted to obtain user input may be limited based on the diversity of the actions. For example, depression of a click of a mouse may be uniformly interpreted to convey a certain type of user input. Consequently, the variety of user input that may be conveyed through actuation may be limited based on how the structures may be actuated.

In general, embodiments disclosed herein may provide methods, systems, and/or devices for interpreting an actuation of a human interface device based on a configuration of a data processing system to obtain user input. The user input may be obtained using a sensing system integrated with the data processing system, and the data processing system may be reconfigurable between at least two configurations. The sensing system may define where the human interface device is positioned, and the sensing system and/or the reconfigurable data processing system (DPS) may define the configuration (of the at least two configurations) of the reconfigurable DPS. By interpreting the actuation based on the position of the human interface device and the configuration of the reconfigurable DPS, the sensing system may allow a diverse interpretation of the actuation despite limited diversity in how the actuations may be performed.

For example, when an actuation of the human interface device is performed while the reconfigurable DPS is configured to a first configuration, the actuation may be interpreted as user input that modifies a brightness setting for a keyboard of the reconfigurable DPS. When the actuation is performed while the reconfigurable DPS is configured to a second configuration, the actuation may be interpreted as different user input that modifies a brightness setting for a display of the reconfigurable DPS. Consequently, limitations regarding how a limited set of actuations may be interpreted to obtain user input used to provide computer implemented services may be reduced. Refer to FIGS. 2A-2H for additional details regarding different interpretation of actuations of human interface devices depending on the configuration of the data processing systems.

In another example, the configuration of the data processing systems may be used to decide which portions of data regarding actuation of the human interface device to use to derive use input. The quality of the different portions of the data may depend on the configuration of the data processing systems. Accordingly, to improve the accuracy of interpretation of the data regarding actuation of the human interface device, some data may be ignored, and other data may be focused on in the interpretation. Refer to FIG. 2H for additional details regarding selection of data based on configuration of data processing systems.

To provide the computer implemented services, a system may include data processing system 100. Data processing system 100 may include hardware components usable to provide the computer implemented services. For example, data processing system 100 may be implemented using a computing device such as a laptop computer, portable computer, and/or other types of computing devices.

Data processing system 100 may host software that may use user input to provide the computer implemented services. For example, the software may provide user input fields and/or other elements through which a user may interact with in order to manage and/or use the computer implemented services provided by data processing system 100.

To obtain information form the user, data processing system 100 may obtain signals and/or data (e.g., sensor data patterns indicating a position and/or orientation, previously mentioned) from sensing system 102 (e.g., via operable connection 106). Data processing system 100 may interpret (e.g., translate) the signals (e.g., may be analog, and data processing system 100 may include an analog to digital converter) and/or data (e.g., digital data) to obtain the user input.

Sensing system 102 may track (e.g., by sensing 108) and/or provide information regarding tracking of human interface device 104 and provide the signals and/or data to data processing system 100. A user may physically interact with human interface device 104, thereby allowing the signals and/or data provided by sensing system 102 to include information regarding the physical actions of the user. For example, if a user moves human interface device 104, sensing system 102 may track the change in position and/or motion of human interface device 104 and provide signals and/or data reflecting the changes in position and/or motion. Similarly, if a user actuates an actuatable portion (e.g., buttons) of human interface device 104, sensing system 102 may track the actuation of the actuatable portion and provide signals and/or data reflecting the actuation.

While described in FIG. 1 with respect to a single human interface device, it will be appreciated that sensing system 102 may track and provide information regarding any number of human interface devices without departing from embodiments disclosed herein.

To track human interface device 104, sensing system 102 may include one or more sensing elements (e.g., one or more sensors) that sense a magnetic field emanating from human interface device 104. The sensors may use the sensed magnetic field to track a location (absolute or relative) and orientation of a magnet included in human interface device 104. The sensing elements may generate the signals and/or data provided by sensing system 102 to data processing system 100. The sensing elements may each sense a magnitude and/or a direction of the field, relative to a placement of each sensing element, as the magnet (emanating the magnetic field) passes proximate to each sensing element. By knowing the placements of the sensing elements with respect to one another, the position and/or orientation of the magnet may be identified based on the sensed magnetic fields to which the sensing elements are exposed (e.g., the magnetic field may be treated as emanating from a magnet with known dimensions and/or strength, and/or other assumptions may be made to deduce the location and/or orientation of the magnet).

Sensing system 102 may also include, for example, analog to digital converters, digital signal processing devices or other signal processing devices, and/or other devices for generating the signals and/or data based on information obtained via the sensing elements.

In an embodiment, sensing system 102 is integrated with data processing system 100. Sensing system 102 may be implemented with a set of sensing elements that are integrated with a chassis (and/or a display enclosure) of data processing system 100. The sensing elements may be grouped into sensing arrays. Any of the sensing arrays may be be positioned with the chassis (and/or the display enclosure) in a manner that allows user input from multiple sources (e.g., any number of human interface devices positioned thereby) to be provided, from sensing system 102, to data processing system 100.

Additionally, interpretation of the user input provided may be based on a configuration (e.g., a range of positions of the sensing arrays relative to one another) of data processing system 100. For example, an actuation of one of the multiple sources (e.g., human interface device 104) while the reconfigurable DPS is configured to a first configuration may be interpreted as a first type of the user input, while the actuation may be interpreted as second type of the user input while the reconfigurable DPS is configured to a second configuration.

Human interface device 104 may be implemented with a physical device that a user may actuate in one or more ways. For example, human interface device 104 may (i) be moveable, (ii) may include one or more buttons, (iii) may include one or more scroll controls, and/or (iv) may include other actuatable elements. Actuating human interface device 104 may change the orientation and/or position of the magnet with respect to the sensing elements of sensing system 102.

For example, when human interface device 104 is moved away from sensing system 102, the strength of the magnetic field emanating from the magnet as sensed by sensing elements of sensing system 102 may decrease. Similarly, when human interface device 104 is rotated, the magnet may be rotated (e.g., in one or more planes) thereby changing the direction of the magnetic field sensed by sensing elements of sensing system 102. Refer to FIGS. 2B-2E for additional details regarding sensing of human interface device 104.

Human interface device 104 may be a passive device. For example, human interface device 104 may not consume power, include batteries or sensors (or other components that may consume power during operation), etc. Rather, to convey information to sensing system 102, human interface device 104 may include a permanent magnet mechanically coupled to actuatable portions. Thus, information regarding actuation of human interface device 104 may be encoded in a static magnetic field produced by the permanent magnet and sensed by sensing system 102. Consequently, human interface device 104 may be of smaller size, lower weight, and/or may provide other advantages when compared to active devices such as a computer mouse powered by a battery or external source.

Additionally, although described singularly (for simplicity of discussion), human interface device 104 may be implemented by one or more physical devices and may include one or more magnets.

Data processing system 100 may perform a lookup or other type of operation to translate the signals and/or data from sensing system 102 into user input. Once obtained, the user input may be used to drive downstream processes.

Figure 3:
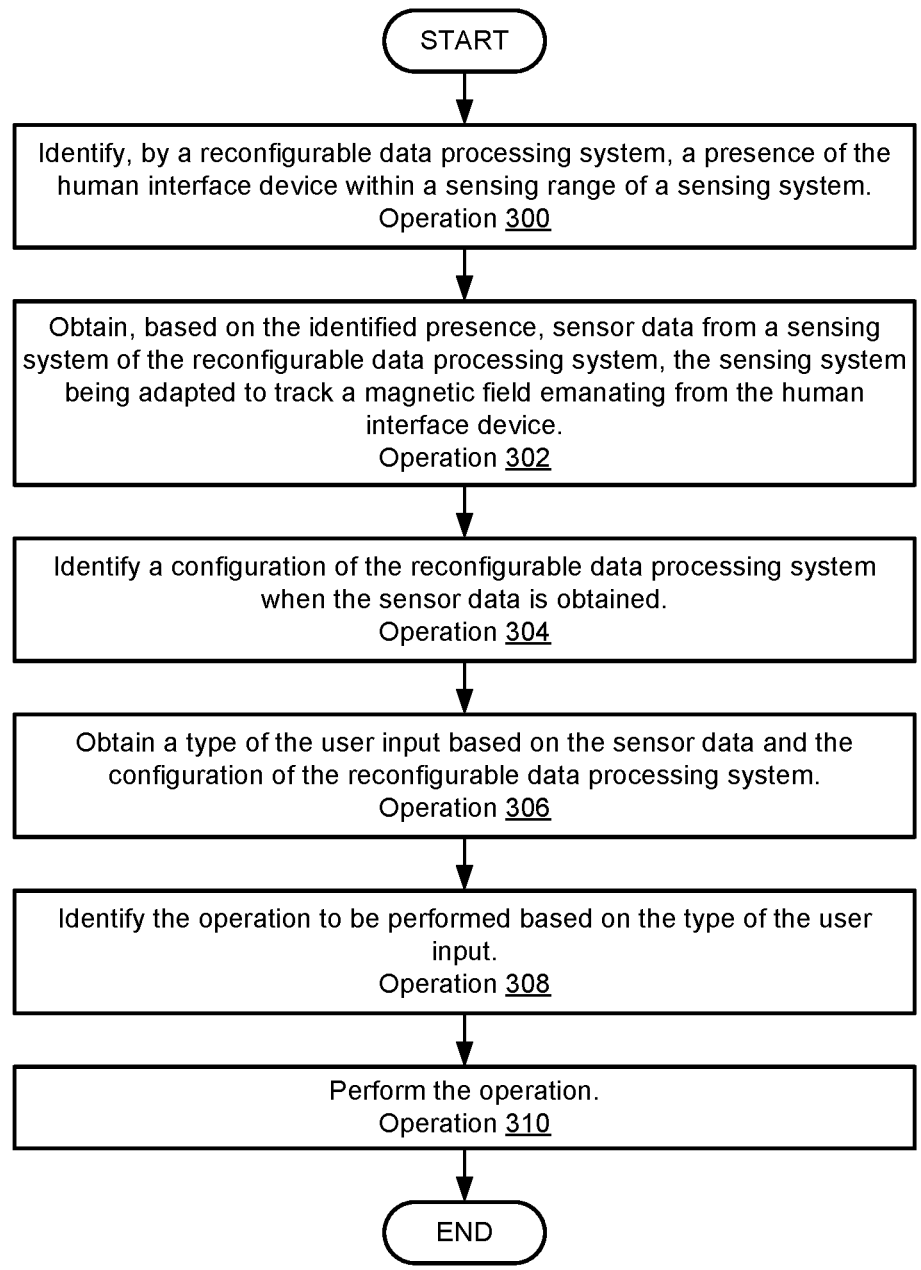
FIG. 3 shows a flow diagram illustrating a method for interpreting user input provided by a human interface device in accordance with an embodiment.

When providing its functionality, data processing system 100 and/or sensing system 102 may perform all, or a portion, of the method illustrated in FIG. 3.

Data processing system 100 may be implemented using a computing device (also referred to as a data processing system) such as a host or a server, a personal computer (e.g., desktops, laptops, 2-in-1 laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, sensing system 102 may be operably connected to data processing system 100 via a wired (e.g., USB) or wireless connection. However, in some embodiment, human interface device 104 may not be operably connected to other devices (e.g., may be a passive device), but may be sensed by sensing system 102 via sensing 108. For example, during sensing 108, a static magnetic field emanating from human interface device 104 may be sensed by sensing system 102.

While illustrated in FIG. 1 as included a limited number of specific components, a system in accordance with an embodiment may include fewer, additional, and/or different components than those illustrated therein.

To further clarify embodiments disclosed herein, diagrams illustrating a sensing system in accordance with an embodiment is shown in FIGS. 2A-2H.

Figure 2A:
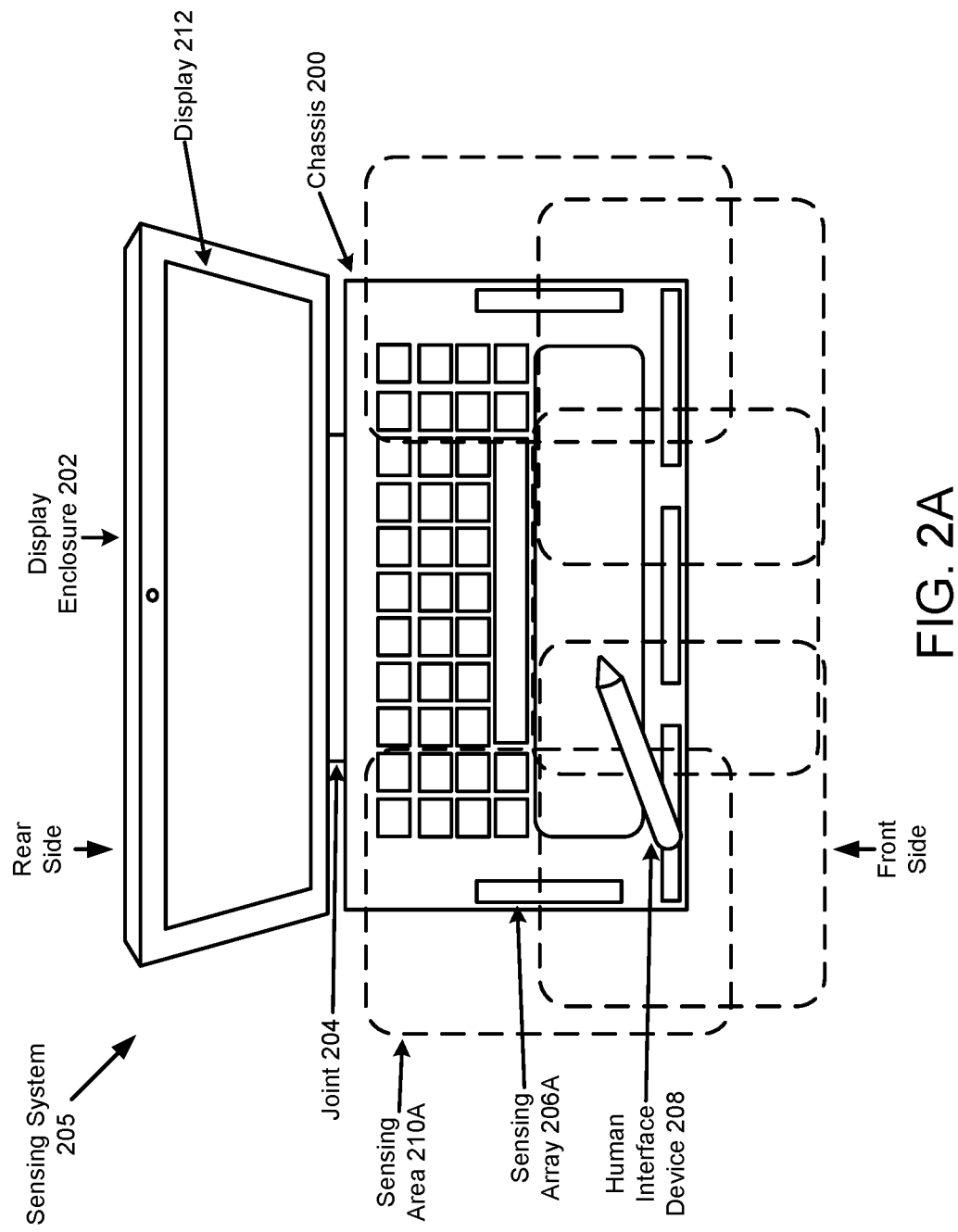
FIG. 2A shows a diagram illustrating a human interface device and a sensing system in accordance with an embodiment.
Figure 2B:
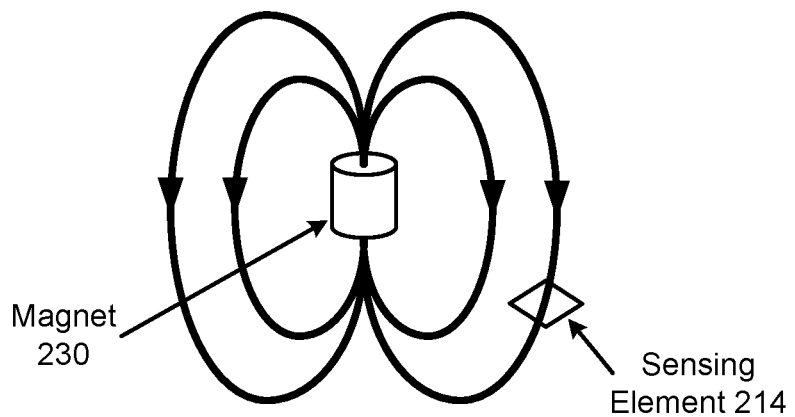
FIGS. 2B-2E show diagrams illustrating field sensing in accordance with an embodiment.
Figure 2C:
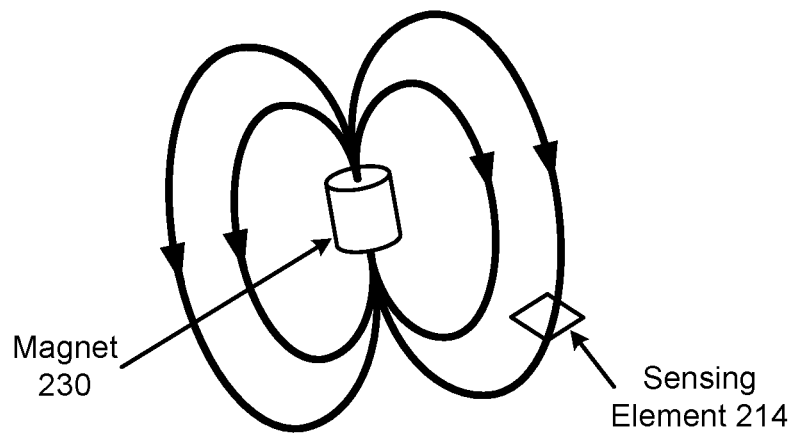
Figure 2D:
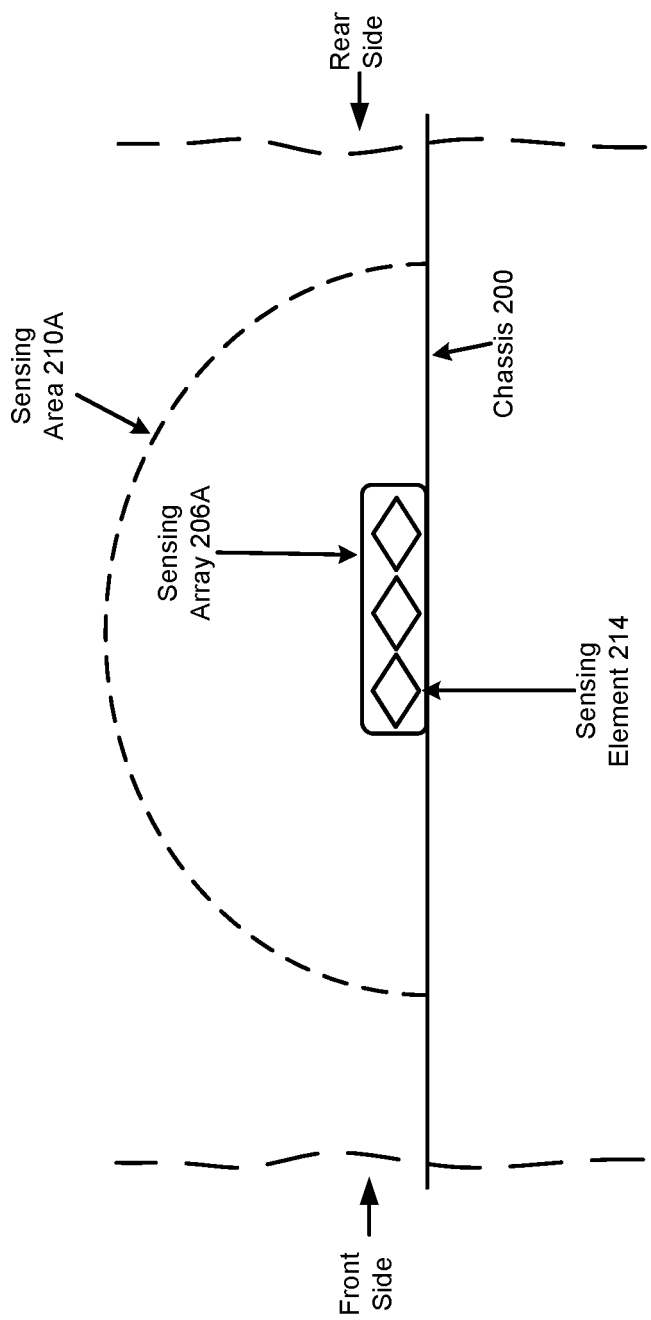

Turning to FIG. 2A, a diagram illustrating a human interface device and a sensing system (e.g., 205) in accordance with an embodiment is shown. Sensing system 205 may be similar to sensing system 102 shown in FIG. 1, and as previously described, may be implemented using sensing elements (e.g., sensors) that are integrated with a reconfigurable data processing system (DPS).

Sensing system 205 may include functionality to obtain, interpret, and implement user input provided by one or more human interface devices (e.g., 208 which may be similar to human interface device 104 shown in FIG. 1). To provide this functionality, the reconfigurable DPS (and therefore sensing system 205) may be implemented using chassis 200, display enclosure 202, and joint 204. Each of these components are discussed below.

Chassis 200 may be implemented using a case or other type of structure in which various elements may be placed on and/or inside thereof. For example, the case may be a computer case which may include various portions (e.g., such as plastic parts produced through forming processes such as injection molding). One of the various portions, for example, may include an exterior surface on which a keyboard may be positioned (e.g., chassis cover 216, mentioned with regard to FIG. 2F).

Chassis 200 may include a first set of sensing arrays, and the first set may include any number of sensing arrays (e.g., 206A). Sensing arrays of the first set may each be positioned at a fixed location (relative to chassis 200) within an interior region of chassis 200. For example, a first portion of the first set may be positioned along a front side of the interior region, a second portion of the first set (e.g., 206A) may be positioned along a first lateral side of the interior region, and a third portion of the first set may be positioned along a second lateral side of the interior region. While not directly on a side of chassis 200, each sensing array of the first set may be positioned close to a side of chassis 200 (e.g., separated by a thickness of chassis 200). Refer to FIG. 2F for an illustration of the interior region of chassis 200.

Display enclosure 202 may be implemented in a manner similar to chassis 200. For example, display enclosure 202 may be implemented using a different case (or other type of structure) in which various elements may be placed on and/or inside thereof. The different case may be an enclosure for a display (e.g., 212) of the reconfigurable DPS. Display 212 may be adapted to show, from a front-side facing external surface of display enclosure 202, a graphical user interface (GUI) for a user to interact with and/or other types of graphical displays.

Display enclosure 202 may include a second set of sensing arrays. The second set of sensing arrays may include any number of sensing arrays (not shown). Sensing arrays of the second set may each be positioned at a fixed location (relative to display enclosure 202) within an interior region of display enclosure 202. Refer to FIG. 2G for additional information regarding the positioning of the second set of sensing arrays.

The interior region of chassis 200 and/or the interior region of display enclosure 202 may further include (i) signal processing components coupled to the sensing elements to generate electrical signals corresponding to the actuations of the human interface device (e.g., 208), (ii) signal aggregation components that allow the electrical signals to be stored and routed, (iii) communication components such as chipsets that allow the signals routed to the communication components to be transmitted to the reconfigurable DPS (e.g., thereby establishing an interface to the reconfigurable DPS through which information may be exchanged), and/or (iv) other types of components for obtaining user input, generating signals corresponding to the user input, and providing the signals to other devices to which sensing system 205 may be operably connected.

Each of the sensing arrays from the first set and the second set of sensing arrays may include similar or different numbers and/or types of sensing elements (each sensing array may be homogenous or heterogenous with respect to sensing element type, different types of sensing elements may have different capabilities such as a noise floor). Each of these sensing elements may be adapted for sensing actuation of human interface devices (e.g., 208). For example, each sensing element may include functionality to measure an intensity and direction of a magnetic field (emanating from a human interface device that is being actuated) to which each sensing element is respectively exposed to. However, each sensing array (and the sensing elements thereof) may only sense the actuation of the human interface devices when the actuation is performed within a sensing range of sensing system 205.

The sensing range of sensing system 205 may be dependent on respective sensing areas (e.g., 210A) of each sensing array (e.g., 206A). Therefore, the combination of the any number of sensing arrays (from the first set and/or the second set) may provide sensing coverage on multiple sides of sensing system 205. Additionally, the sensing areas may be independent (e.g., non-overlapping) or coextensive (e.g., overlapping). For example, sensing area 210A (associated with sensing array 206A) and a second sensing area (e.g., 210B, discussed with regard to FIG. 2F) may partially overlap (e.g., as illustrated using overlapping and dashed outlines in FIGS. 2A, 2F-2G).

While illustrated in FIG. 2A as extending laterally from sensing system 205, sensing area 210A (and other sensing areas of sensing system 205) may extend above and/or below (e.g., as illustrated by a dashed outline in FIGS. 2D-2E) the reconfigurable DPS of sensing system 205. Refer to FIGS. 2B-2E for additional details regarding field sensing.

Joint 204 may be implemented using a movable joint (e.g., a hinge). A length of joint 204 may be aligned with a width of chassis 202, and a width of display enclosure 202. Joint 204 may have a functionality to rotatably connect chassis 200 to display enclosure 202. For example, display enclosure 202 may be able to rotate around joint 204 in a manner such that an angle between chassis 200 and display enclosure 202 may increase, or decrease, depending on a direction in which display enclosure 202 and/or chassis 200 is rotated. By doing so, joint 204 may be adapted to facilitate reconfiguration of an orientation of chassis 200 and display enclosure 202 between at least two configurations (e.g., joint 204 and/or other structures may allow display enclosure 202 and chassis 200 to be positioned and/or oriented in different arrangements corresponding to different configurations).

In a first of the at least two configurations, both the keyboard positioned on the exterior surface of chassis 200 and display 212 may be presented to a user (e.g., orientation of sensing system 205 illustrated in FIG. 2A). While in the first configuration, the first set of sensing arrays and the second set of the sensing arrays may be able to sense the presence of a human interface device (e.g., 208) proximate to display 212.

In a second of the at least two configurations, only display 212 is presented to the user (e.g., orientation of sensing system 205 as illustrated in FIG. 2H). While in the second configuration, the first set of sensing arrays may be unable to sense the presence of the human interface device proximate to display 212 and the second set of sensing arrays is able to sense the presence of the human interface device proximate to display 212. Refer to FIG. 2H for additional details regarding the at least two configurations. Additionally, while described with respect to two configurations facilitated by a single joint, it will be appreciated that other types of structure (e.g., translational rather than rotational joins) may be used to facilitate reconfiguration of a reconfigurable DPS into any number of configurations which may be similar to and/or different from those discussed herein.

While illustrated in FIG. 2A as having specific shapes and sizes, it will be appreciated that the shapes and sizes of sensing arrays (e.g., 206A) and/or sensing areas (e.g., 210A) are merely illustrative and the shapes and sizes may be different without departing from embodiments disclosed herein.

By positioning the sensing elements as discussed above, one or more human interface devices positioned by sensing system 205 may allow a user to provide user input. The user input may be obtained by tracking magnetic fields using the sensing elements from the first and/or the second set of sensing arrays. The tracked magnetic fields may be used to identify the user input. Refer to FIGS. 2D-2H for additional information regarding the example implementation of sensing systems (e.g., 102 & 205).

As discussed above, magnetic fields may be sensed to identify actuations of human interface devices. Turning to FIGS. 2B-2C diagrams illustrating a magnet (e.g., 230) and a sensing element (e.g., 214) in accordance with an embodiment are shown. As noted above, human interface device 104 (or a similar human interface device, such as 208) may include magnet 230 (e.g., a permanent magnet). Magnet 230 may project a magnetic field. In these figures, the magnetic field is illustrated using lines with arrows superimposed over the midpoints of the lines. The direction of the arrow indicates and orientation of the field.

As seen in FIG. 2B, when magnet 230 is proximate (e.g., within a predetermined distance range, such as the sensing areas discussed with regard to FIG. 2A, which may vary depending on the strength of magnet 230 and sensitivity level of sensing elements of the sensing arrays) to sensing element 214, the magnetic field may be of sufficient strength to be measurable by sensing element 214. Sensing element 214 may utilize any sensing technology to measure the magnitude and/or the orientation of the magnetic field at its location. Due to the magnetic field distribution of magnet 230, the magnitude and orientation of the magnetic field at the location of sensing element 214 may be usable to identify, in part, the location and orientation of magnet 214.

For example, when magnet 230 is rotated as shown in FIG. 2C from the orientation as shown in FIG. 2B, the direction and/or magnitude of the magnetic field at the location of sensing element 214 may change. By identifying the magnitude and orientation of the magnetic field at a number of locations (e.g., corresponding to different sensing elements), the position and orientation of magnet 230 may be identified.

Figure 2E:
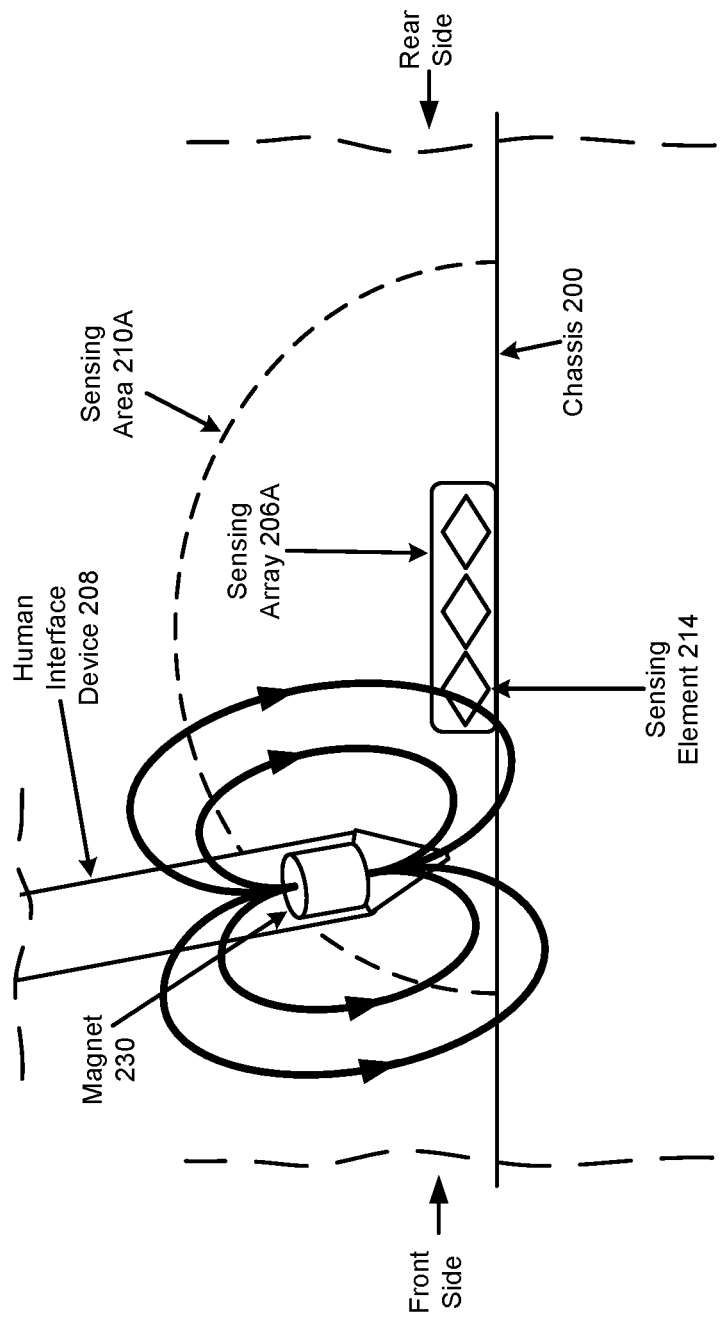
Figure 2F:
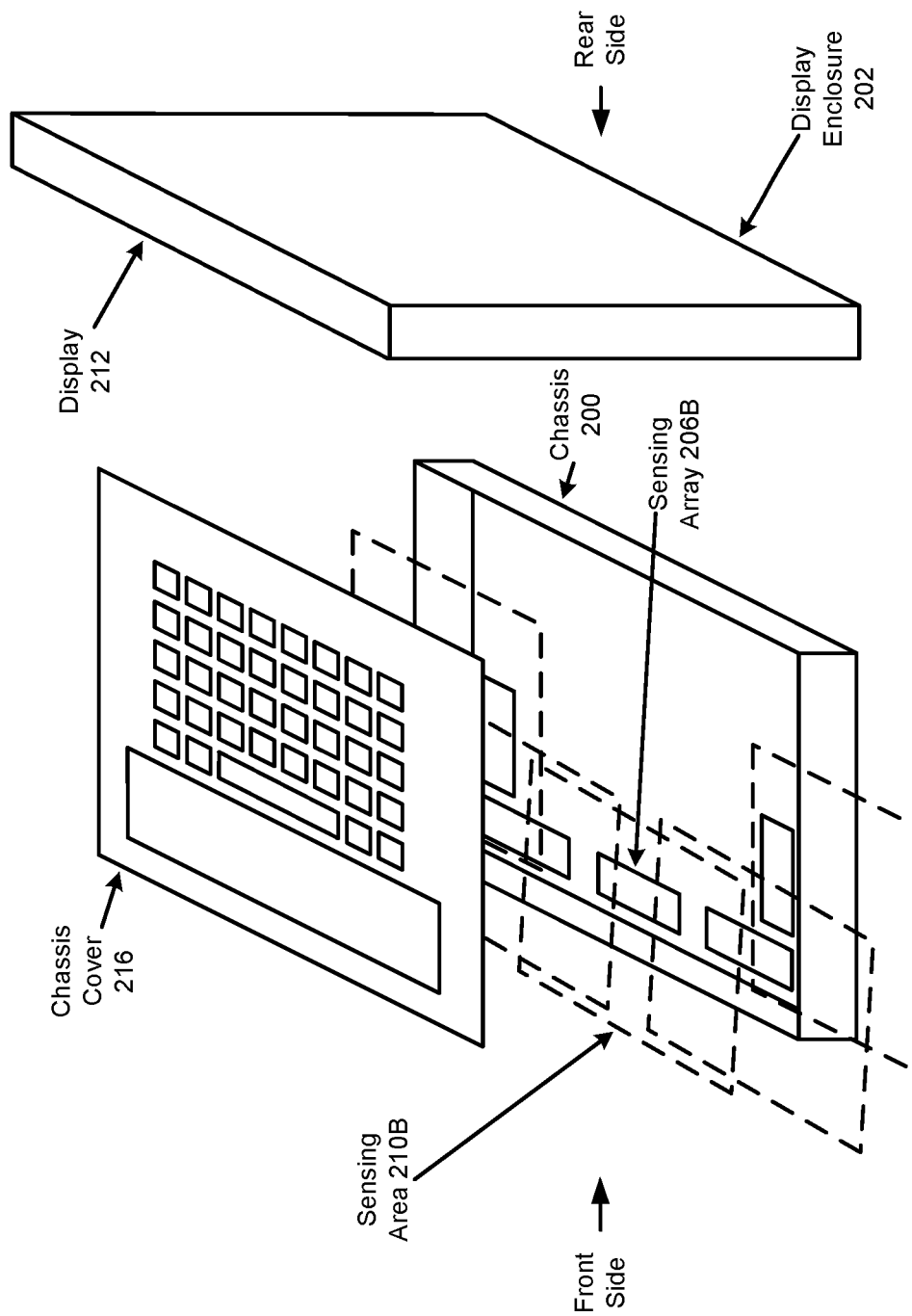
FIGS. 2F-2G show diagrams illustrating an example implementation of a sensing system in accordance with an embodiment.
Figure 2G:
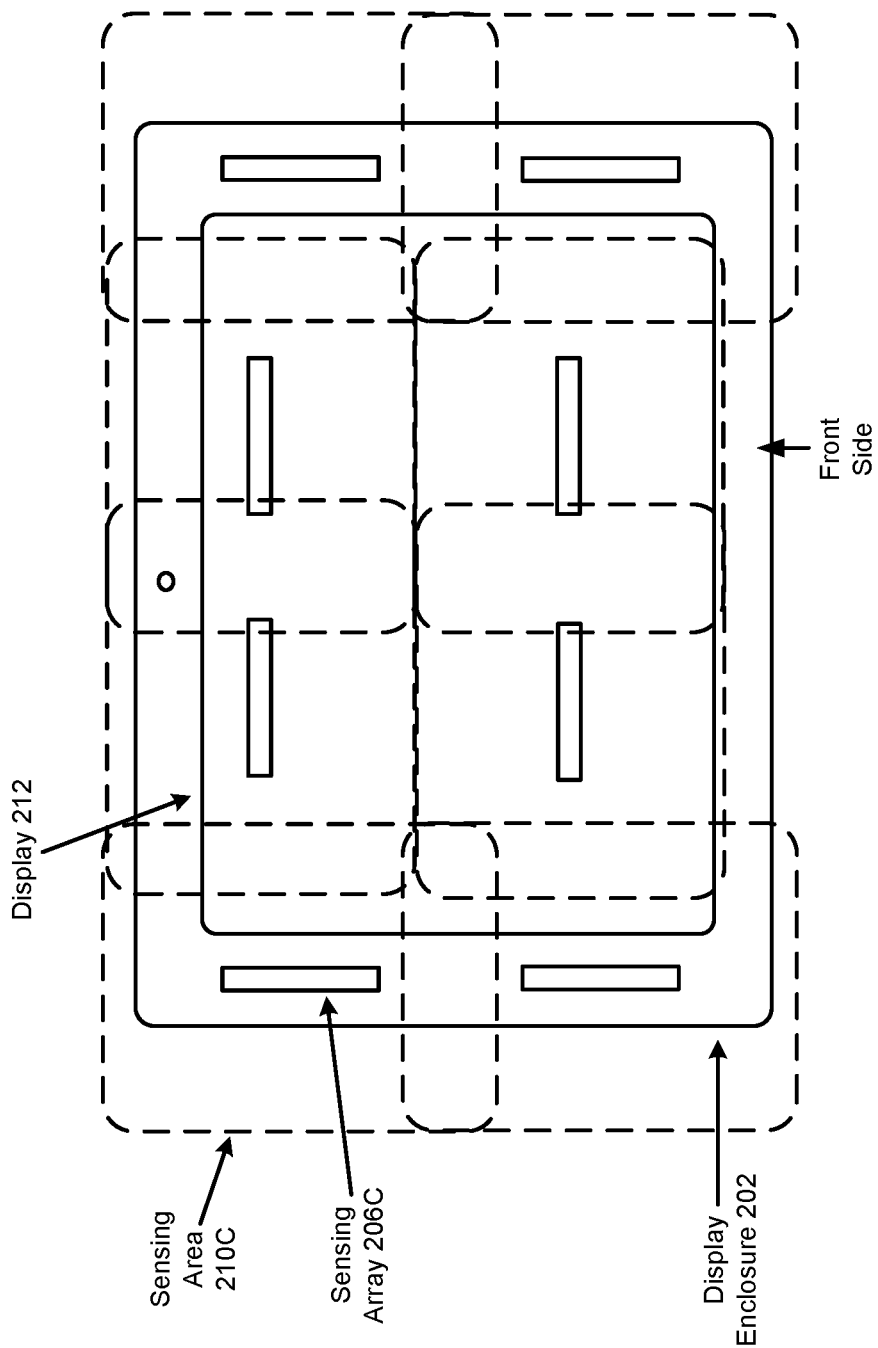
Figure 2H:
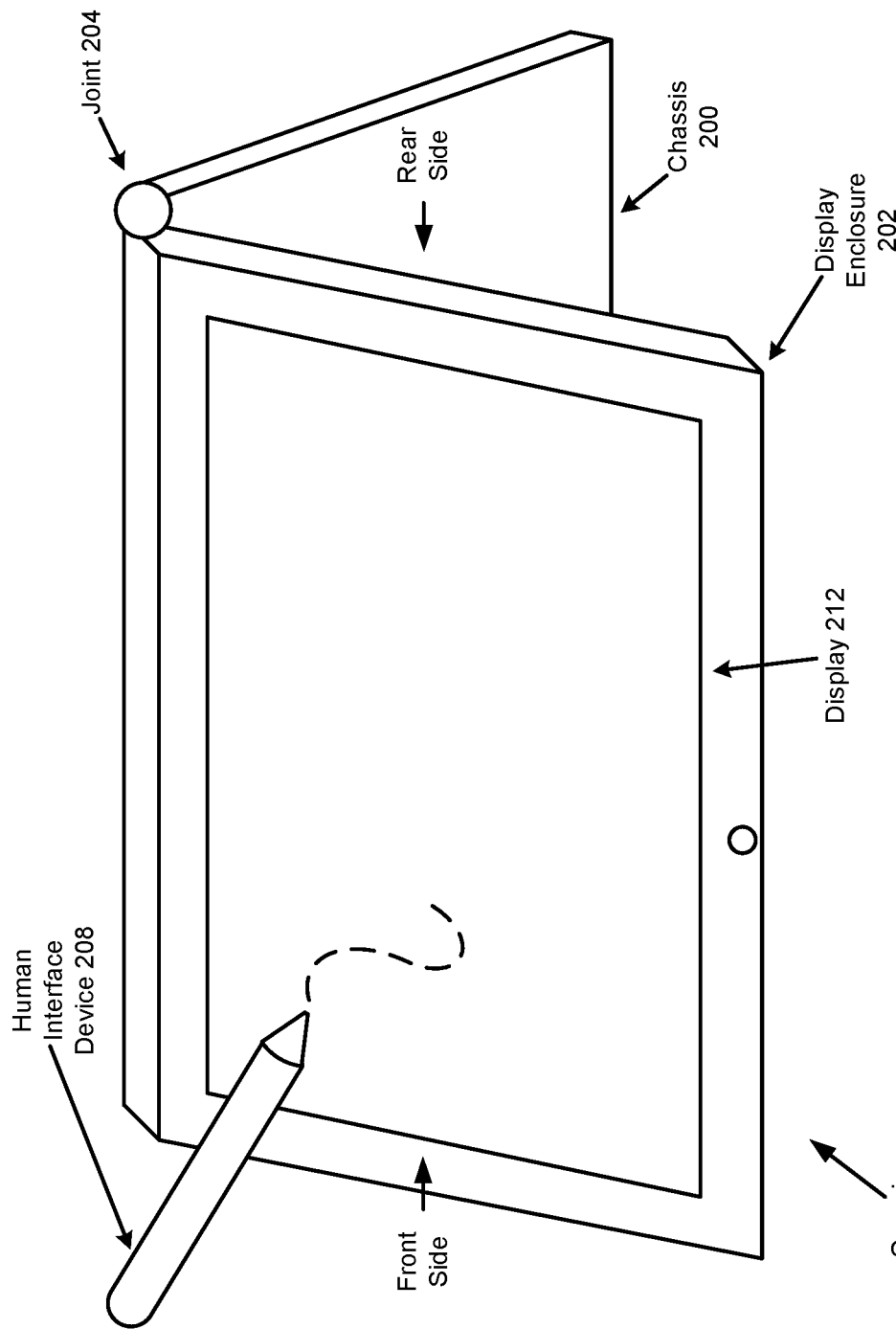
FIG. 2H shows a diagram illustrating a data processing system in accordance with an embodiment.

To utilize the location and orientation of the magnet embedded in human interface device 104 to obtain user input, magnet 230 may be mechanically coupled to the actuatable elements and/or body of the human interface device (e.g., as illustrated with regard to FIG. 2E). By doing so, information regarding actuation of the human interface device by a user may be encoded into the magnetic field projected by magnet 230 and sensed by sensing element 214. For additional information regarding field sensing in the context of the implementation discussed in FIG. 2A, refer to FIGS. 2D-2E.

Turning to FIGS. 2D-2E, diagrams illustrating field sensing by a sensing element (e.g., 214) of sensing system 205 in accordance with an embodiment is shown. Additionally, in FIGS. 2D-2E, the wavy lines drawn in long dashing indicate that the surface on which chassis 200 of sensing system 205 is positioned may continue passed the wavy dashed lines.

As seen in FIG. 2D, sensing element 214 may be one of the sensing elements included in sensing array 206A (discussed with regard to FIG. 2A), and sensing area 210A may extend above chassis 200 of sensing system 205. As previously discussed, the actuation of a human interface device (e.g., 208) may be sensed only when the actuation is performed within the sensing range of sensing system 205. The sensing range may be a combination of respective sensing areas (e.g., 210A illustrated with a dashed outline) of each sensing array (e.g., 206A). Therefore, sensing element 214 may only sense actuations performed within at least a portion of sensing area 210A.

For example, as seen in FIG. 2E, magnet 230 may be embedded in human interface device 208 (e.g., or a similar human interface device, such as 104) and sensing element 214 may be a sensing element of sensing system 205. By actuating (and/or repositioning) human interface device 208, the actuation may be encoded in the emitted magnetic field of the embedded magnet 230. This actuation may be sensed by sensing element 214 and/or other sensing elements of sensing array 206A when performed within a range of sensing area 210A.

Turning to FIG. 2F, a side view diagram of sensing system 205 in accordance with an embodiment is shown. This side view diagram may illustrate a portion of components discussed with regard to FIG. 2A in a disassembled state, allowing for a depiction of sensing elements integrated with the reconfigurable DPS. The keyboard (e.g., chassis cover 216) that may be positioned on the exterior surface of chassis 200, mentioned with regard to FIG. 2A, may be lifted from the rest of chassis 200 to reveal the interior region of chassis 200.

As discussed with regard to FIG. 2A, chassis 200 may include the first set of sensing arrays. Each sensing array of the first set may be positioned within the interior region of chassis 200, for example, as illustrated in FIG. 2F. Sensing arrays (e.g., 206B) of the first set may each be positioned at a fixed location (relative to chassis 200) within the interior region of chassis 200. For example, a first portion of the first set (e.g., sensing array 206B) may be positioned along a front side of the interior region.

While depicted as not being directly on a side of chassis 200, each sensing array (e.g., 206B) of the first set may be positioned close to a side of chassis 200 (e.g., as 206B is positioned close to a front-facing side of chassis 200 instead of being directly positioned on the side).

Turning to FIG. 2G, a diagram illustrating a display enclosure (e.g., 202) of sensing system 205 in accordance with an embodiment is shown. This diagram may illustrate another portion of components discussed with regard to FIG. 2A, allowing for a second depiction of sensing elements integrated with the reconfigurable DPS.

As discussed with regard to FIG. 2A, display enclosure 202 may include the second set of sensing arrays, and each sensing array of the second set may be positioned within the interior region (not explicitly shown) of display enclosure 202. Sensing arrays (e.g., 206C) of the second set may each be positioned at a fixed location (relative to display enclosure 202) within the interior region of display enclosure 202. For example, and as illustrated in FIG. 2G, a first portion of the second set (e.g., sensing array 206C) may be positioned along a first lateral side of display enclosure 202, a second portion of the second set may be positioned along a second lateral side of display enclosure 202, and a third portion of the second set may be positioned with display 212 of display enclosure 202 (e.g., behind display 212). Similar to the first set of sensing arrays, the first and second portions of the second set may not be directly on a side of display enclosure 202. Instead, sensing arrays (e.g., 206C) of the first and second portion of the second set may be positioned close to a side of display enclosure 202 (e.g., as 206C is positioned close to a front-facing side of display enclosure 202 instead of being directly positioned on the side).

By doing so, the combination of the any number of sensing arrays (from the first set and/or the second set) may provide sensing coverage for multiple sides of chassis 200 and/or display enclosure 202 (e.g., of sensing system 205).

Additionally, while illustrated in FIG. 2F-2G as having specific shapes, sizes, and positioning, it will be appreciated that the shapes, sizes, and positioning of sensing arrays (e.g., 206B-206C) and/or sensing areas (e.g., 210B-210C) are merely illustrative and the shapes, sizes, and positioning may be different without departing from embodiments disclosed herein.

Turning to FIG. 2H, a diagram illustrating a human interface device (e.g., 208) and a sensing system (e.g., 205) in accordance with an embodiment is shown. As seen in FIG. 2H, sensing system 205 may be in the second configuration of the at least two configurations discussed with regard to FIG. 2A.

By being reconfigurable between the at least two configurations, sensing system 205 may obtain sensor data (e.g., magnitude and/or orientation of a magnetic field emanating from human interface device 208 provided by sensing elements of sensing system 205) and may interpret the sensor data based on a configuration of sensing system 205 when the sensor data is obtained.

To do so, the sensor data may include (i) a first portion of sensor data obtained from the first set of sensing arrays, and (ii) a second portion of sensor data obtained from the second set of sensing arrays. For example, while in the second configuration, only display 212 may be presented to a user. The first set of sensing arrays (e.g., positioned with chassis 200) may be unable to sense the presence of human interface device 208 when proximate to display 212, and the second set of sensing arrays may be able to sense the presence. Therefore, (i) the first set of sensing arrays may be unable to provide the first portion of sensor data, (ii) the second set of sensing arrays may be able to provide the second portion of sensor data, and (iii) the interpretation of the sensor data provided by sensing system 205 may be based only on the second portion of sensor data when configured to the second configuration.

Thus, depending on the configuration of a reconfigurable DPS, various portions of sensor data obtained while in that configuration may be ignored when identifying user input because such portions of sensor data may be unreliable (e.g., out of range of the human interface devices).

Refer to FIG. 3 for additional details regarding the interpretation of sensor data based on a configuration of sensing system 205 when the sensor data is obtained.

As discussed above, the components of FIGS. 1-2H may perform various methods to obtain and interpret user input provided by a human interface device. FIG. 3 illustrates a method that may be performed by the components of FIGS. 1-2H. In the diagram discussed below and shown in these figures, any of the operations may be repeated, performed in different orders, omitted, and/or performed in parallel with or a partially overlapping in time manner with other operations.

Turning to FIG. 3, a flow diagram illustrating a method for interpreting user input provided by a human interface device in accordance with an embodiment is shown. The method may be performed by data processing system 100, sensing system 102, human interface device 104, and/or other components of the system of FIG. 1.

At operation 300, a presence of the human interface device is identified within a sensing range of a sensing system by a reconfigurable data processing system (DPS). The presence of the human interface device may be identified by sensing a presence of a magnetic field produced by a magnet of the human interface device. The sensing range of the sensing system may include individual sensing ranges for each sensing array (refer back to the description of FIGS. 2B-2E for additional information regarding field sensing).

At operation 302, based on the identified presence, sensor data is obtained from the sensing system of the reconfigurable DPS, the sensing system being adapted to track a magnetic field emanating from the human interface device. The sensor data may be obtained (e.g., over time) by sensing properties (e.g., an orientation, position, and/or path of motion) of the magnet of the human interface device with respect to the sensing system. These properties may be sensed by (i) obtaining measurements of the magnetic field emanating from the magnet, and (ii) computing the position, orientation, and/or path of motion based on the measurements.

As mentioned with regard to FIG. 1, it will be appreciated that the sensing system may track and provide information regarding any number of human interface devices without departing from embodiments disclosed herein.

Additionally, it will be appreciated that the human interface device may be actuated any number of times, in any number of ways, and/or for any duration of time. This duration, number (frequency), and/or a speed of the actuation (determined by the duration of time) of the human interface device may be used to determine a type of the user input (discussed further below).

At operation 304, a configuration of the reconfigurable DPS is identified when the sensor data is obtained. The configuration may be identified by (i) obtaining sensor data (e.g., from sensors which may indicate the position/orientation of portions of chassis/enclosures of the reconfigurable DPS) indicating the configuration of the reconfigurable DPS, (ii) performing a reliability checking process for different portions of sensor data obtained from different sensing arrays of a sensing system, (iii) reading information from storage or receiving information from another device indicating the configuration of the reconfigurable DPS, (iv) obtaining user input indicating the configuration of the reconfigurable DPS, and/or via other methods.

To obtain the sensor data, a sensor that identifies the position/orientation of portions of the reconfigurable DPS may be read. The reading may include the sensor data.

To perform the reliability checking process, the signal levels measured by the sensing arrays may be compared to thresholds to identify whether a human interface device is likely in range of the respective sensing arrays. The sensing arrays that are identified as being in range of the human interface device may be used to identify the configuration of the reconfigurable DPS. For example, a lookup in a data structure may be performed. The data structure may associate different groups of sensing arrays that are in range of a human interface device with corresponding configurations of the reconfigurable DPS.

Additionally, an orientation of a first portion (e.g., a chassis) of the reconfigurable data processing system relative to an orientation of a second portion (e.g., a display enclosure) of the reconfigurable data processing system may be identified based on the identified configuration.

The reconfigurable DPS may be configurable between at least a first configuration and a second configuration. For example, the first configuration may include a chassis of the reconfigurable DPS being positioned at a first angle (e.g., between 45 degrees and 180 degrees) to a display enclosure of the reconfigurable DPS. While in this first configuration, a user of the reconfigurable DPS may be able to utilize a keyboard positioned on the cover of the chassis and a display included in the display enclosure positioned to face the user. Alternatively, the second configuration may include the chassis being positioned at a second angle (e.g., between 180 degrees and 360 degrees) to the display enclosure of the reconfigurable DPS. While in this second configuration, the user of the reconfigurable DPS may be unable to utilize the keyboard. The display included in the display enclosure may be positioned to face the user but may have a different orientation to the orientation of the display enclosure while in the first configuration.

At operation 306, a type of the user input is obtained based on the sensor data and the identified configuration of the reconfigurable data processing system. The type of the user input may be obtained by (i) identifying a set of types of the user input from at least two sets of types of the user input that is associated with the identified configuration, and (ii) performing a lookup based on the sensor data, the lookup returning the type of the user input, and the type of the user input being from the identified set of types of the user input.

For example, a first set of types of the user input may be associated with the first configuration and a second set of types of the user input may be associated with the second configuration. Hence, when the lookup is performed, only the set of the types of the user input that is associated with the identified configuration may be used to perform the lookup, thereby saving time and resources when performing the lookup.

The pattern matching may be performed, for example, by comparing the sensor data to sensor data patterns of a generalized set of sensor data patterns to obtain a matched sensor data pattern. These sensor data patterns in the generalized set may be associated with various respective types of the user input. Furthermore, these sensor data patterns may be obtained (and therefore, placed in the generalized set once obtained) by monitoring past positions, orientations, and/or paths of motion of magnet(s) of the human interface device. Once a sensor data pattern is found to match the sensor data, an associated type of the user input (e.g., associated with the matched sensor data pattern) may be returned from the lookup as the type of the user input.

Additionally, in another example, the identified configuration of the reconfigurable DPS may be used to decide which portions of the sensor data to use to obtain the type of the user input. The quality of the different portions of the sensor data may depend on the configuration of the reconfigurable DPS. Based on the quality of the different portions, some portions may not be used to obtain the type of the user input (e.g., by performing a reliability check, as previously mentioned at operation 304). For example, while in the second configuration, the chassis of the reconfigurable DPS may be oriented in a manner in which the first set of sensing arrays (integrated with the chassis) are unable to accurately sense actuations of the human interface device. The first set of sensing arrays may be unable to accurately sense the actuations because the human interface device may be outside a range of sensing of the first set of sensing arrays. Furthermore, the display enclosure of the reconfigurable DPS may be oriented in a manner in which the second set of sensing arrays (integrated with the display enclosure) are able to accurately sense actuations of the human interface device. The second set of sensing arrays may be able to accurately sense the actuations because the human interface device may be within a range of sensing of the second set of sensing arrays. Subsequently, a first portion of the sensor data associated with the first set of sensing arrays may be ignored, and a second portion of the sensor data associated with the second set of sensing arrays may be focused on to obtain the type of the user input.

Accordingly, to improve the accuracy of interpretation of the sensor data, various portions of sensor data obtained while in the identified configuration may be ignored when identifying user input because such portions of sensor data may be unreliable (e.g., out of range of the human interface devices).

At operation 308, an operation to be performed is identified based on the type of the user input. The operation may be identified by providing the user input to an application or other entity that consumes the type of the user input. For example, the application may use the type of the user input to identify a function to be performed.

The operation may also be identified by, for example, using the position of the human interface device to identify a change in focus of the user (e.g., a cursor location on a display). The combination of the focus of the user and the user input (e.g., based on the user clicking an actuatable portion of a human interface device) may then be used to identify, for example, a function of the application or other type of functionality to be initiated or otherwise performed.

At operation 310, the operation is performed. The operation may be performed by, for example, an operating system passing through or otherwise providing information regarding the operation to an application or other consumer of the user input. The consumer may then take action based on the command.

For example, the reconfigurable DPS may host an operating system, drivers, and/or other executing entities that may take responsibility for translating signals/data from the sensing system into operations or other types of user input.

The method may end following operation 310.

Thus, using the method illustrated in FIG. 3, embodiments disclosed herein may facilitate selection of good quality sensor data, based on device configuration, and may allow for different types of user input to be determined (e.g., interpreted) in different configurations despite being associated with similar actions (e.g., actuations and/or repositioning of human interface devices). By selecting good quality sensor data, determinations regarding how the sensor data is interpreted may be more accurate.

Figure 4:
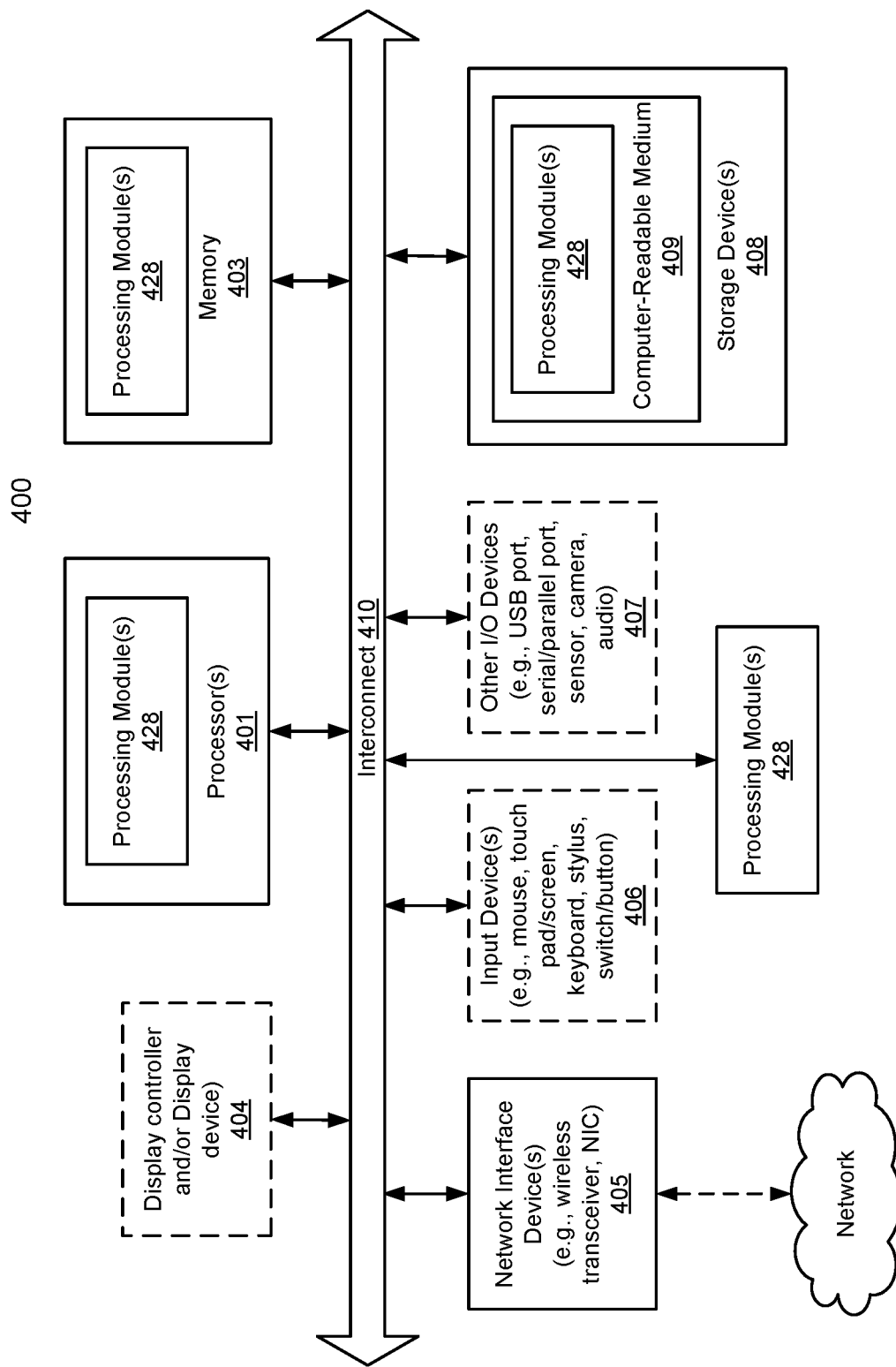
FIG. 4 shows a block diagram illustrating a data processing system in accordance with an embodiment.

Any of the components illustrated in FIGS. 1-2H may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components.

These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for interpreting user input obtained using a human interface device, the method comprising:
    identifying, by a reconfigurable data processing system, a presence of the human interface device within a sensing range of a sensing system of the reconfigurable data processing system, wherein the sensing system comprises a first set of sensing arrays positioned within an interior of a chassis of the reconfigurable data processing system and a second set of the sensing arrays positioned within a display enclosure of the reconfigurable data processing system;
    obtaining, based on the identified presence, sensor data from the sensing system, the sensing system being adapted to track an intensity and a direction of a magnetic field emanating directly from a magnet embedded within the human interface device, wherein the sensor data comprises a first portion obtained from the first set of sensing arrays and a second portion obtained from the second set of the sensing arrays;
    identifying a configuration of the reconfigurable data processing system when the sensor data is obtained, wherein the reconfigurable data processing system comprises at least two configurations, and wherein in one of the at least two configurations, one of the first portion or the second portion of the sensor data is ignored by the sensing system without either of the first set of sensing arrays or the second set of the sensing arrays being deactivated after the reconfigurable data processing system is configured to be in the one of the at least two configurations;
    obtaining a type of the user input based on the sensor data and the identified configuration of the reconfigurable data processing system;
    identifying an operation to be performed based on the type of the user input; and
    performing the operation.

2. The method of claim 1, wherein the reconfigurable data processing system comprises:
    the chassis;
    the display enclosure that houses a display; and
    a joint that rotatably connects the chassis to the display enclosure, and a length of the joint being aligned with:
        a width of the chassis, and
        a width of the display enclosure,
    wherein the first set of the sensing arrays comprises:
        a first portion of the first set of the sensing arrays, the first portion being positioned along a front side of the interior of the chassis;
        a second portion of the first set of the sensing arrays, the second portion being positioned along a first lateral side of the interior of the chassis; and
        a third portion of the first set of the sensing arrays, the third portion being positioned along a second lateral side of the interior of the chassis,
    wherein the first portion, the second portion, and the third portion of the first set of the sensing arrays are all detached from one another.

3. The method of claim 2, wherein the joint is adapted to facilitate reconfiguration of an orientation of the chassis and display enclosure between the at least two configurations, in a first of the at least two configurations both a keyboard of the reconfigurable data processing system and a display of the reconfigurable data processing system are presented to a user, and in a second of the at least two configurations only the display is presented to the user.

4. The method of claim 3, wherein while in the first of the at least two configurations, the first set of sensing arrays and the second set of the sensing arrays are able to sense the presence of the human interface device proximate to the display, and while in the second of the at least two configurations, the first set of sensing arrays is unable to sense the presence of the human interface device proximate to the display and the second set of sensing arrays is able to sense the presence of the human interface device proximate to the display.

5. The method of claim 4, wherein obtaining the type of the user input based on the sensor data and the identified configuration further comprises:
    in a first instance of the sensor data where the chassis and the display enclosure are in the first of the at least two configurations:
        using the first portion and the second portion of the sensor data to obtain the type of the user input;
    in a second instance of the sensor data where the chassis and the display enclosure are in the second of the at least two configurations:
        ignoring the first portion of the sensor data; and
        using the second portion of the sensor data to obtain the type of the user input.

6. The method of claim 5, wherein using the second portion of the sensor data to obtain the type of the user input comprises:
ingesting the second portion of the sensor data into a first pattern matching system that provides the type of the user input.

7. The method of claim 6, wherein using the first portion and the second portion of the sensor data to obtain the type of the user input comprises:
ingesting the first portion of the sensor data and the second portion of the sensor data into a second pattern matching system that provides the type of the user input.

8. A non-transitory machine-readable medium having instructions stored therein, which when executed by a processor, cause the processor to perform operations for interpreting user input obtained using a human interface device, the operation comprising:
identifying, by a reconfigurable data processing system, a presence of the human interface device within a sensing range of a sensing system of the reconfigurable data processing system, wherein the sensing system comprises a first set of sensing arrays positioned within an interior of a chassis of the reconfigurable data processing system and a second set of the sensing arrays positioned within a display enclosure of the reconfigurable data processing system;
obtaining, based on the identified presence, sensor data from the sensing system, the sensing system being adapted to track an intensity and a direction of a magnetic field emanating directly from a magnet embedded within the human interface device, wherein the sensor data comprises a first portion obtained from the first set of sensing arrays and a second portion obtained from the second set of the sensing arrays;
identifying a configuration of the reconfigurable data processing system when the sensor data is obtained, wherein the reconfigurable data processing system comprises at least two configurations, and wherein in one of the at least two configurations, one of the first portion or the second portion of the sensor data is ignored by the sensing system without either of the first set of sensing arrays or the second set of the sensing arrays being deactivated after the reconfigurable data processing system is configured to be in the one of the at least two configurations;
obtaining a type of the user input based on the sensor data and the identified configuration of the reconfigurable data processing system;
identifying an operation to be performed based on the type of the user input; and
performing the operation.

9. The non-transitory machine-readable medium of claim 8, wherein the reconfigurable data processing system comprises:
the chassis;
the display enclosure that houses a display; and
a joint that rotatably connects the chassis to the display enclosure, and a length of the joint being aligned with:
a width of the chassis, and
a width of the display enclosure,
wherein the first set of the sensing arrays comprises:
a first portion of the first set of the sensing arrays, the first portion being positioned along a front side of the interior of the chassis;
a second portion of the first set of the sensing arrays, the second portion being positioned along a first lateral side of the interior of the chassis; and
a third portion of the first set of the sensing arrays, the third portion being positioned along a second lateral side of the interior of the chassis,
wherein the first portion, the second portion, and the third portion of the first set of the sensing arrays are all detached from one another.

10. The non-transitory machine-readable medium of claim 9, wherein the joint is adapted to facilitate reconfiguration of an orientation of the chassis and display enclosure between the at least two configurations, in a first of the at least two configurations both a keyboard of the reconfigurable data processing system and a display of the reconfigurable data processing system are presented to a user, and in a second of the at least two configurations only the display is presented to the user.

11. The non-transitory machine-readable medium of claim 10, wherein while in the first of the at least two configurations, the first set of sensing arrays and the second set of the sensing arrays are able to sense the presence of the human interface device proximate to the display, and while in the second of the at least two configurations, the first set of sensing arrays is unable to sense the presence of the human interface device proximate to the display and the second set of sensing arrays is able to sense the presence of the human interface device proximate to the display.

12. The non-transitory machine-readable medium of claim 11, wherein obtaining the type of the user input based on the sensor data and the identified configuration comprises:
in a first instance of the sensor data where the chassis and the display enclosure are in the first configuration:
using the first portion and the second portion of the sensor data to obtain the type of the user input;
in a second instance of the sensor data where the chassis and the display enclosure are in the second configuration:
ignoring the first portion of the sensor data; and
using the second portion of the sensor data to obtain the type of the user input.

13. A data processing system, comprising:
a processor; and
a memory coupled to the processor to store instructions, which when executed by the processor, cause the processor to perform operations for interpreting user input obtained using a human interface device, the operations comprising:
identifying, by a reconfigurable data processing system, a presence of the human interface device within a sensing range of a sensing system of the reconfigurable data processing system, wherein the sensing system comprises a first set of sensing arrays positioned within an interior of a chassis of the reconfigurable data processing system and a second set of the sensing arrays positioned within a display enclosure of the reconfigurable data processing system;
obtaining, based on the identified presence, sensor data from the sensing system, the sensing system being adapted to track an intensity and a direction of a magnetic field emanating directly from a magnet embedded within the human interface device, wherein the sensor data comprises a first portion obtained from the first set of sensing arrays and a second portion obtained from the second set of the sensing arrays;

identifying a configuration of the reconfigurable data processing system when the sensor data is obtained, wherein the reconfigurable data processing system comprises at least two configurations, and wherein in one of the at least two configurations, one of the first portion or the second portion of the sensor data is ignored by the sensing system without either of the first set of sensing arrays or the second set of the sensing arrays being deactivated after the reconfigurable data processing system is configured to be in the one of the at least two configurations;

obtaining a type of the user input based on the sensor data and the identified configuration of the reconfigurable data processing system;

identifying an operation to be performed based on the type of the user input; and performing the operation.

14. The data processing system of claim 13, wherein the reconfigurable data processing system comprises:
the chassis;
the display enclosure that houses a display; and
a joint that rotatably connects the chassis to the display enclosure, and a length of the joint being aligned with:
a width of the chassis, and
a width of the display enclosure,
wherein the first set of the sensing arrays comprises:
a first portion of the first set of the sensing arrays, the first portion being positioned along a front side of the interior of the chassis;
a second portion of the first set of the sensing arrays, the second portion being positioned along a first lateral side of the interior of the chassis; and
a third portion of the first set of the sensing arrays, the third portion being positioned along a second lateral side of the interior of the chassis,
wherein the first portion, the second portion, and the third portion of the first set of the sensing arrays are all detached from one another.

15. The data processing system of claim 14, wherein the joint is adapted to facilitate reconfiguration of an orientation of the chassis and display enclosure between the at least two configurations, in a first of the at least two configurations both a keyboard of the reconfigurable data processing system and a display of the reconfigurable data processing system are presented to a user, and in a second of the at least two configurations only the display is presented to the user.

16. The data processing system of claim 15, wherein while in the first of the at least two configurations, the first set of sensing arrays and the second set of the sensing arrays are able to sense the presence of the human interface device proximate to the display, and while in the second of the at least two configurations, the first set of sensing arrays is unable to sense the presence of the human interface device proximate to the display and the second set of sensing arrays is able to sense the presence of the human interface device proximate to the display.

17. The method of claim 1, wherein the human interface device is a passive device without an internal power source and without an external power source.

18. The method of claim 1, wherein the first set of sensing arrays covers a first area external to the reconfigurable data processing system and the second set of the sensing arrays covers a second area external to the reconfigurable data processing system, and wherein the first area external to the reconfigurable data processing system covered by the first set of sensing arrays is larger than the second area external to the reconfigurable data processing system covered by the second set of the sensing arrays.

19. The method of claim 1, wherein the second set of the sensing arrays of the sensing system that is adapted to track the intensity and the direction of the magnetic field emanating directly from the magnet embedded within the human interface device is disposed directly behind a display screen of the reconfigurable data processing system that displays images, and wherein the display screen is surrounded by a display enclosure.

20. The data processing system of claim 16, wherein obtaining the type of the user input based on the sensor data and the identified configuration comprises:
in a first instance of the sensor data where the chassis and the display enclosure are in the first configuration:
using the first portion and the second portion of the sensor data to obtain the type of the user input;
in a second instance of the sensor data where the chassis and the display enclosure are in the second configuration:
discarding the first portion of the sensor data; and
using the second portion of the sensor data to obtain the type of the user input.

* * * * *